US006616792B2

(12) United States Patent
Sigel et al.

(10) Patent No.: US 6,616,792 B2
(45) Date of Patent: *Sep. 9, 2003

(54) SURFACE COVERING HAVING A PRECOATED, E-BEAM CURED WEARLAYER COATED FILM AND PROCESS OF MAKING THE SAME

(75) Inventors: Gary A. Sigel, Lancaster, PA (US); John R. Eshbach, Jr., Lancaster, PA (US); George E. Bagley, Lancaster, PA (US); F. Joseph Appleyard, East Petersburg, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/068,185

(22) Filed: Feb. 5, 2002

(65) Prior Publication Data

US 2002/0176976 A1 Nov. 28, 2002

Related U.S. Application Data

(63) Continuation of application No. 08/610,364, filed on Mar. 4, 1996, now Pat. No. 6,375,786.

(51) Int. Cl.$^7$ .................. B32B 31/00

(52) U.S. Cl. .................. 156/273.3; 156/278; 156/324.4; 427/496; 428/345

(58) Field of Search .................. 427/496; 428/345; 156/324.4, 278, 273.3

(56) References Cited

U.S. PATENT DOCUMENTS

| | | | |
|---|---|---|---|
| 3,247,012 A | 4/1966 | Burlant | 522/3 |
| 3,442,730 A | 5/1969 | Dietz | 156/324.4 |
| 3,658,620 A | 4/1972 | Hall | |
| 3,785,850 A | 1/1974 | Parker | 427/496 |
| 4,138,299 A | 2/1979 | Bolgiano | |
| 4,508,740 A | 4/1985 | Föll et al. | 427/496 |
| 4,804,429 A | 2/1989 | Appleyard et al. | |
| 5,093,223 A | 3/1992 | Iwasawa et al. | 430/280 |
| 5,401,560 A | 3/1995 | Williams | |
| 6,054,502 A | 4/2000 | Friedlander et al. | 427/496 |

FOREIGN PATENT DOCUMENTS

| | | | |
|---|---|---|---|
| EP | 0494 658 A2 | 1/1992 | |
| JP | 4-5036 | 1/1992 | 156/278 |

*Primary Examiner*—Michael W. Ball
*Assistant Examiner*—Todd J Kilkenny
(74) *Attorney, Agent, or Firm*—Womble Carlyle; Sandridge & Rice, PLLC

(57) ABSTRACT

A surface covering has a base to which is laminated a rigid vinyl film. The film is precoated with an electron beam cured wearlayer. The preferred wearlayer composition is a polymerizable organic urethane-polyester wearlayer coating. The coated printed film is prepared by application of a polyester urethane acrylate composition to a printed sheet of rigid vinyl film and the coating is exposed to a low accelerating energy Electro-curtain to form an abrasion resistant topcoat with no apparent degradation of printed rigid vinyl film.

15 Claims, 3 Drawing Sheets

SURFACE COVERING HAVING A PRECOATED, E-BEAM CURED WEARLAYER COATED FILM AND PROCESS OF MAKING THE SAME

This is a continuation of application Ser. No. 08/610,364 filed Mar. 4, 1996, now U.S. Pat. No. 6,375,786.

FIELD OF THE INVENTION

This invention is directed to a surface covering, and more particularly to a floor covering product in which a wearlayer composition, preferably an acrylated urethane composition is coated onto a polyvinyl chloride (PVC) or vinyl composition film, preferably a rigid vinyl film, and cured with low energy electron beam (EB) radiation to form a wearlayer/film composite, prior to lamination and embossing of the composite wearlayer/film to a surface covering substrate. The floor covering product may be a floor tile or a floor covering sheet.

In the preferred process of making the surface covering, the composite is laminated to the substrate on a belt or drum line to form the final product. To deter yellowing of the PVC film, the energy level of the EB radiation is less than 135 KeV with a 2.75 inch average gap. Preferably, the energy level of the EB radiation is no greater than 130 KeV with a 2.75 inch average gap. The preferred dosage to cure the wearlayer composition is about 2 to about 4 Mrad.

In a preferred embodiment, the wear layer composition is formed by reaction of a hydroxyterminated polyester with an isocyanurate in the presence of a multifunctional acrylate. The wear layer composition is cured by the low energy electron beam radiation. The coated decorative rigid film is laminated to a tile base and then cut to form the floor tile product.

BACKGROUND OF THE INVENTION

Hall U.S. Pat. No. 3,658,620 teaches a method of preparing a sheet capable of being laminated which includes saturating a porous membrane material on both sides with a resin material and subsequently polymerizing the resin with high energy radiation in the form of an electron beam to afford a non-tacky undersurface and a relatively tacky exposed surface. The tacky surface is later used as an adhesive layer. High electron beam dosage (20 Mrad) and accelerating energy (150 to 450 KeV) are required to enable the electrons to penetrate the porous material and cure the impregnated resin to yield a non-tacky surface that can be stripped from a drum. The impregnated porous membrane is laminated to a plywood substrate with the tacky side of the membrane facing the substrate. The final laminar structure is subjected to high energy electron beam to ensure a good mechanical bond between the porous membrane and the substrate.

Williams U.S. Pat. No. 5,401,560 teaches a method for preparing a nonslip floor matte which includes a mineral oxide grit impregnated urethane vinyl layer bonded to a ribbed polyvinyl chloride floor material. The mineral oxide grit resin system is applied to a polyvinyl layer and cured using an electron beam at high electron accelerating energy of 250 to 325 KeV.

SUMMARY OF THE INVENTION

The present invention is based on a method of making a surface covering having a PVC film which is precoated with a wearlayer, the wearlayer being cured with low energy electron beam radiation. In the preferred embodiment, the acrylated urethane coated rigid vinyl film is cured with electron beam radiation of less than 135 KeV. The low energy radiation does not yellow the decorative PVC film by the degradation processes commonly observed when a polyvinyl chloride film is subjected to EB radiation. The composite structure is laminated to a continuous sheet of floor covering base under process conditions that yield an aesthetically acceptable composite and then the sheet is cut into floor tile.

"Rigid vinyl film" is a term of art which means a polyvinyl chloride film having less than 5 parts plasticizer per hundred parts by weight of resin (phr). Preferably, there is substantially no added plasticizer in the rigid vinyl film.

One object of the invention is to provide a surface covering having a wearlayer/film composite, the wearlayer comprising a composition including a cross-linked organic moiety, the film comprising a vinyl composition, the film having a thickness of no greater than about 20 mils, the wearlayer having been cured with electron beam radiation, and the film having a Delta b of no greater than 2 as measured before and after curing of the wearlayer composition.

Another object of the invention is to provide a surface covering having a wearlayer/film composite, the wearlayer comprising a composition including a cross-linked organic moiety, the wearlayer composition being substantially free of photoinitiator, the film comprising a vinyl composition and having a thickness of no greater than about 20 mils, and the film having a Delta b of no greater than 2 as measured before coating of the wearlayer composition and after curing of the wearlayer composition.

Still another object o the invention is to provide a process of making a surface covering which includes the steps of providing a film of vinyl material, coating the film with a wearlayer composition comprising a cross-linkable organic moiety, and curing the wearlayer composition with electron beam radiation, the electron beam radiation having an energy level of less than that imparted by a 135 KeV field with a 2.75 inch gap.

DETAILED DESCRIPTION OF THE INVENTION

Figure 1:
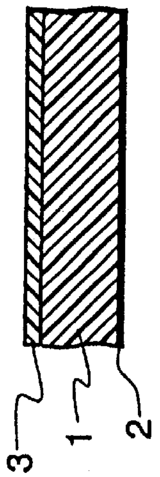
FIG. 1 is a cross-section of the wearlayer/film composite of the present invention.
Figure 2:
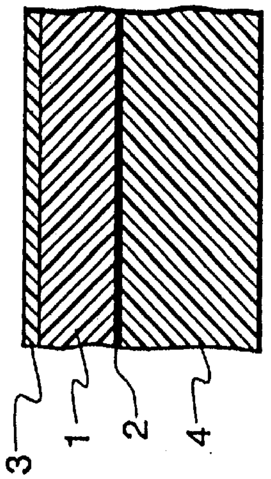
FIG. 2 is a cross-section of the laminated surface covering of the present invention.

Referring to FIG. 1, the wearlayer/film composite of the present invention has a polyvinyl chloride film base 1. In the preferred embodiment, the base is a rigid vinyl film which is printed on one side with an ink layer 2. The wearlayer 3 is a cross-linkable organic containing composition which is cured in contact with the printed film with a low energy electron beam radiation. The wearlayer composition includes an organic moiety which is cross-linked by the EB radiation. The wearlayer composition can also be mechanically embossable. The preferred organic moieties are ethylenic, acrylic and epoxide. Epoxide moieties have been cured by EB as described by P. A.F. Buijsen in a dissertation entitled "Electronic Beam Induced Cationic Polymerization with Onium Salts." The wearlayer is preferably about 1 to about 3 mils in thickness. As shown in FIG. 2, the wearlayer/film composite is laminated to a surface covering base 4 to form the preferred surface covering of the present invention.

Figure 3:
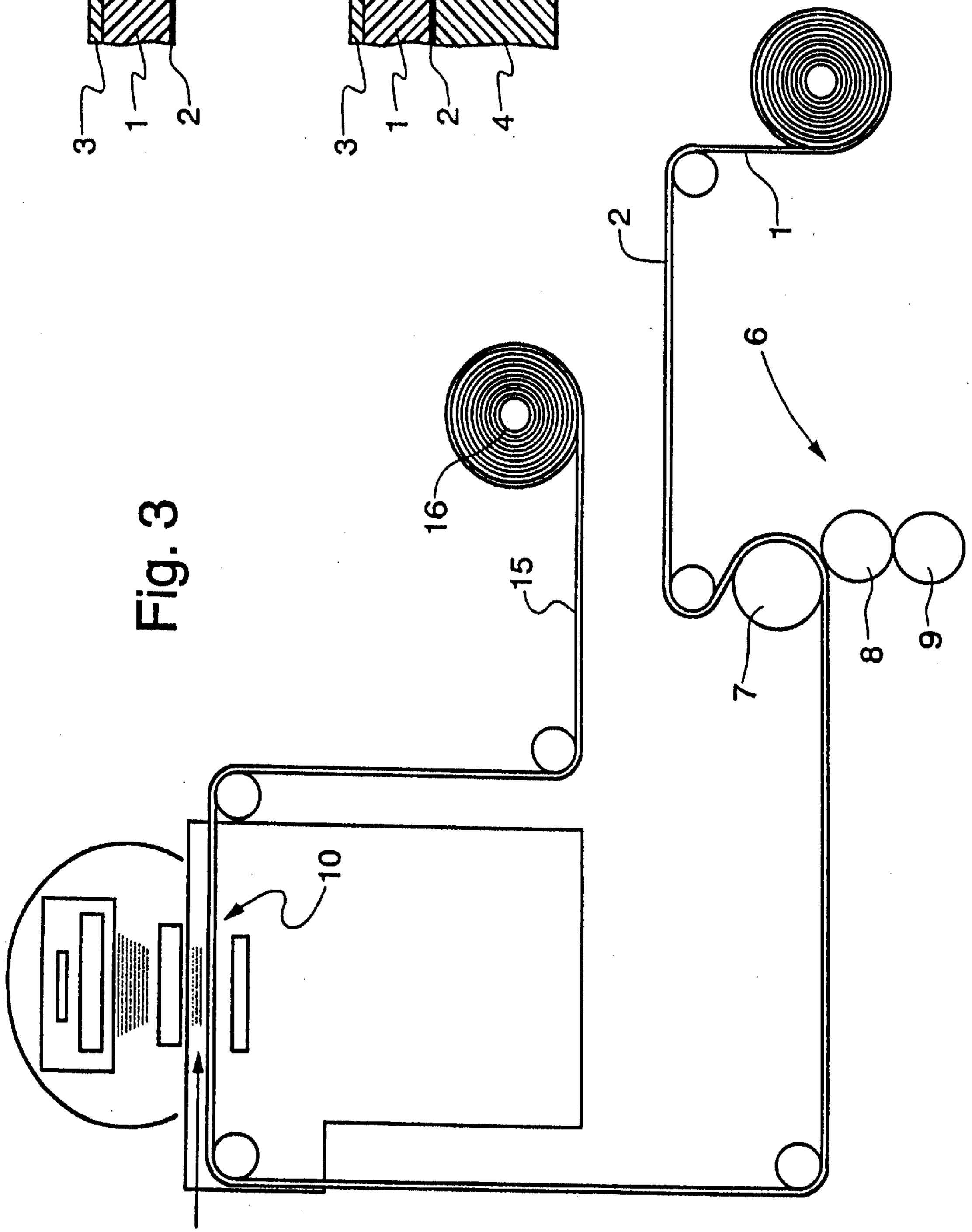
FIG. 3 is a schematic representation of a process for making the wearlayer/film composite of the present invention.

Referring to FIG. 3, the polyvinyl chloride film 1 is fed into a coater 6 such that the side opposite the decorative ink layer 2 is coated with the wearlayer composition. The preferred polyvinyl chloride film is a rigid vinyl film having a thickness of no greater than about 20 mils, more preferably no greater than about 10 mils, and most preferably about 1 to about 3 mils in thickness.

The method of coating application can be, but is not limited to, a wire wound rod or a three roll coater. In the reverse roll coater shown in FIG. 3, the film passes through the nip between the backing roll 7 and applicator roll 8. The metering roll is indicated by reference numeral 9.

The temperature of the rolls is kept well below the glass transition temperature of the film, 176° F. (80° C.), but warm enough to maintain the resin viscosity to allow for improved flow characteristics, thereby eliminating coating defects commonly observed with high viscosity coatings.

The coated film enters the nitrogen inerted processing zone 10 of the electron beam unit where energetic electrons initiate radical polymerization of the ethylenic groups of the coating composition. After the wearlayer is cured, the wearlayer/film composite 15 is rolled onto a small diameter windup core 16. A non-flexible floor covering that exhibits low elongation can result in the formation of across machine direction fractures once the composite film is wound onto the core.

The wearlayer resin composition used in this invention must exhibit performance properties sought in the surface covering. For floor covering products, the wearlayer properties include good stain resistance and gloss retention as well as sufficient toughness to resist gouging from foot wear traffic. For the purpose of this invention, the floor coverings must also display a certain degree of flexibility.

Although not limited to polyurethane polyester, resin compositions that are useful as the wearlayer composition of this invention include the reaction product of a diisocyanate and/or isocyanuate structure, a polyester polyol and a polyester having hydroxyl and acryl functionalities, or the reaction product of a hydroxy terminated aromatic polyester formed from the reaction product of polycarboxylic acid(s), excess diol and acrylic acid, such as described in Bolgiano U.S. Pat. No. 4,138,299. Other wearlayer compositions useful in the present invention include (meth)acrylated polyesters in which the polyester is the reaction product of a tricarboxylic acid or anhydride and a diol, a colloidal silica/acrylate and an epoxide/polyol.

The preferred polyurethane polyester resin materials are mixed with mono-, di- or tri-functional acrylates to form the wearlayer composition. Other additives can include surfactants and UV absorbers.

The second step in the current invention after coating the wearlayer composition onto the rigid vinyl film is to cure the coated rigid vinyl film with ionizing radiation in such a fashion as not to degrade or yellow the rigid vinyl film or alter the appearance of the decorative layer. An electron beam radiation process polymerizes the ethylenically unsaturated groups within the wearlayer resin material causing the composition to change from a liquid to a solid. Ultraviolet radiation is not useful for this invention.

Commercially available medium pressure ultraviolet mercury lamp sources have a strong infrared component which results in excessive heating of the coating composition and the film. The infrared component can be as much as 60% of the total lamp power. Curing the resin material on rigid vinyl film by UV lamps results in film distortion as a result of the temperature of the film exceeding the glass transition temperature of the film.

Distorted film cannot be processed into a commercially acceptable floor tile. When the film is laminated, the coated side adheres to the laminator and does not release form the laminator roll. This is because the coated side is only partially cured by the UV.

The preferred embodiment of this invention utilizes ionizing radiation in the form of low energy accelerated electrons. This method referred to as electron beam (EB) curing requires that a nitrogen atmosphere be above the coating to be cured since the presence of oxygen in high concentrations will result in a tacky surface. A tacky surface formed by electron beam curing, as that described in U.S. Pat. No. 3,658,620 is not useful for this invention.

Since heat in the form of infrared energy is essentially eliminated by using accelerated electrons, the substrate can be kept below its glass transition temperature and remain free of distortion while the wear layer composition is fully cured.

Typically, commercially available self-shielded electron beam units (Energy Science Inc., or RPC Industries) operate to produce an electron accelerating energy between 150,000 to 500,000 electron volts (150 KeV to 500 KeV). In curing applications where the preferred coating weight is 60 grams per meter square, more than 90 percent of the electrons penetrate into the substrate at an electron energy of 150 KeV. Such energy is sufficient to cause degradation of the rigid vinyl film and result in a yellow appearance that alters the decorative appeal.

Utilizing low electron beam accelerating energy of less than 135,000 electron volts, and preferably no greater than about 130,000 electron volts, (assuming an average gap of substrate to window of 2.75 inches) has been found to limit electron penetration into the vinyl film and minimize yellowing of the vinyl film. This is particularly important for white decorative rigid vinyl film where slight yellowing produces an undesirable effect.

By using a low energy electron beam, a film which is capable of yellowing more than a Delta b of 2 and is coated with a wear layer composition will not be exposed to excessive electron energy, and therefore will not yellow more than a Delta b of 2. Further, even though the yellowing is slight, the double bond conversion of the wearlayer composition is greater than 75%, and preferably greater than 85%.

At an average gap between the window and the substrate of 2.75 inches, a typical electron beam unit will lose approximately 10 KeV per inch gap of accelerating energy. Hence an electron beam machine operating at 125 KeV with a gap of 2.75 inches could resemble that of another machine operating at 105 to 110 KeV with a gap of 1.0 inch.

The degree of yellowing can be measured by use of a calorimeter that measures tristimulas color values of 'a', 'b', and 'L', where the color coordinates are designated as +a (red), −a (green), +b (yellow), −b (blue), +L (white), and −L (black). It is more appropriate to express the degree of yellowing as Delta b or difference in b values between the initial and final values. A Delta b difference greater than 1 can generally be detected by the naked eye.

The 'dose' or amount of ionizing radiation is referred to as a 'rad' where one rad is equal to 100 ergs of energy absorbed from ionizing radiation per gram of material. More commonly used terminology is a 'Megarad' (Mrad) or $10^6$ rad. The dose required to cure the coating will be dependent on the chemistry of the coating and line speed. In the current application, a uniform dose of 2 to 4 Megarad, is sufficient to cure the resin material.

Figure 4:
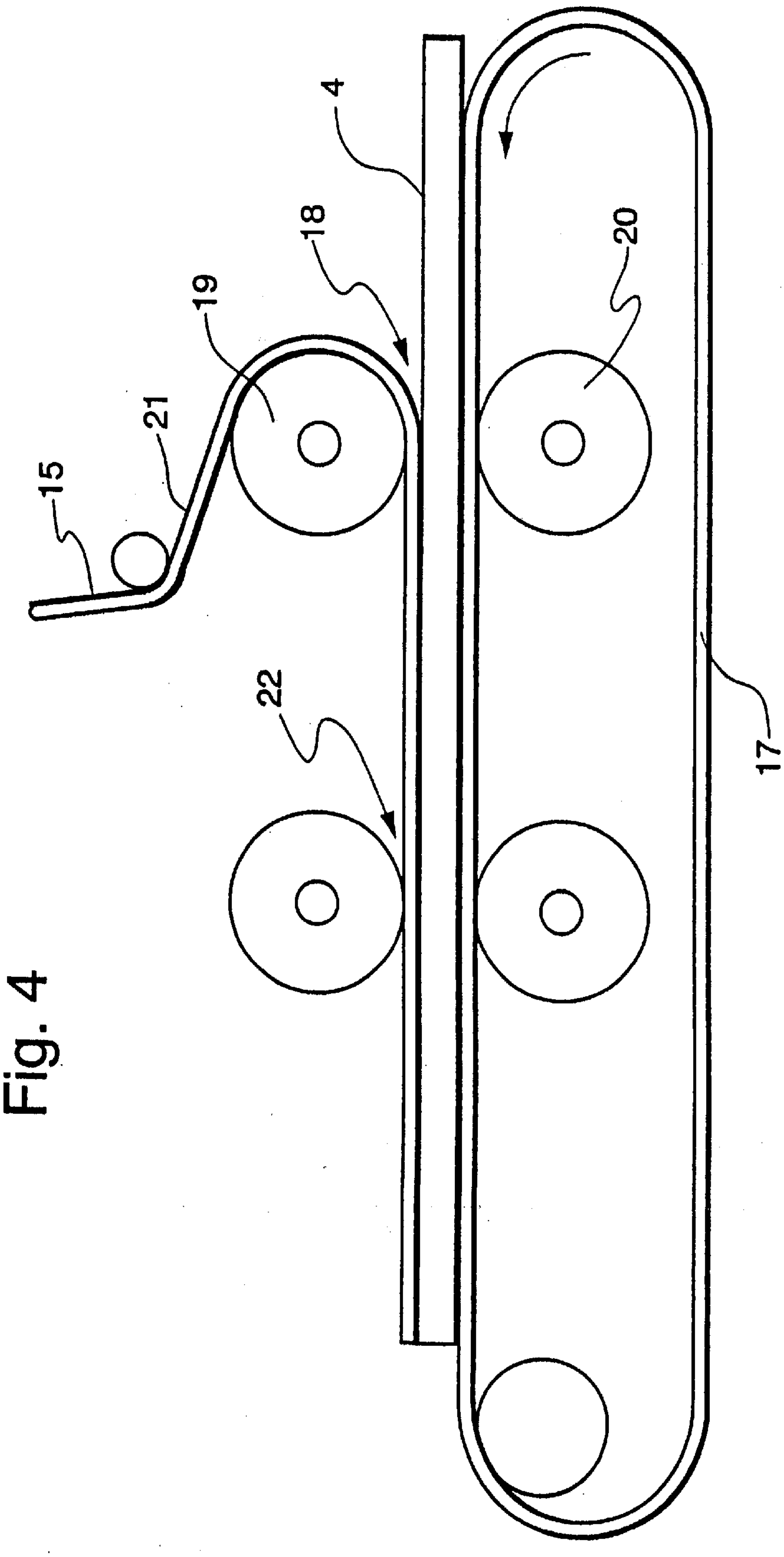
FIG. 4 is a schematic representation of a process to laminate and emboss the wearlayer/film composite of the present invention to a substrate.

The third step in the process is lamination/embossing of the precoated decorative PVC film to a surface covering base. Two methods for forming a floor covering are on a belt or drum line. Referring to FIG. 4 for a belt line, a vinyl mixture sheet 4 is provided on a conveyor 17 at a temperature of 300° F. (149° C.) to 330° F. (166° C.). The composition of the vinyl mixture is resin material, plasticizer and filler to afford a floor covering base preferably 42 to 80 mils in thickness such as disclosed in Appleyard U.S. Pat. No. 4,804,429.

The belt 17 is heated to allow for good adherence of the sheet 4 to the belt 17. The vinyl mixture makes contact with at least one nip. Each nip is formed by two vertical rolls where the bottom roll is referred to as a backing roll and the top roll is referred to as a laminator or embossing roll.

The coated decorative vinyl film 15 is fed into the first nip 18 (space between two vertical rolls 19 and 20) with the exposed side 21 being the side opposite the wearlayer. In the first nip, the precoated film 15 and floor covering base or sheet 4 are laminated. The heat of the base or sheet raises the temperature of the film above the glass transition temperature in the nip where the film and sheet are laminated.

At the glass transition temperature, the PVC film is stress free and can be embossed. The roll 19 can be an embossing roll thereby allowing lamination and embossing to be carried out in one step.

A second nip 22 can be used to provide an embossed effect on the laminated rigid film/base structure. After the second nip, the surface of the rigid film/base is cooled by pouring water onto the film/base to reduce the product temperature below the glass transition temperature of the rigid film 15. Stresses that developed during processing as a result of heat will be locked in to afford a flat floor covering structure.

Figure 5:
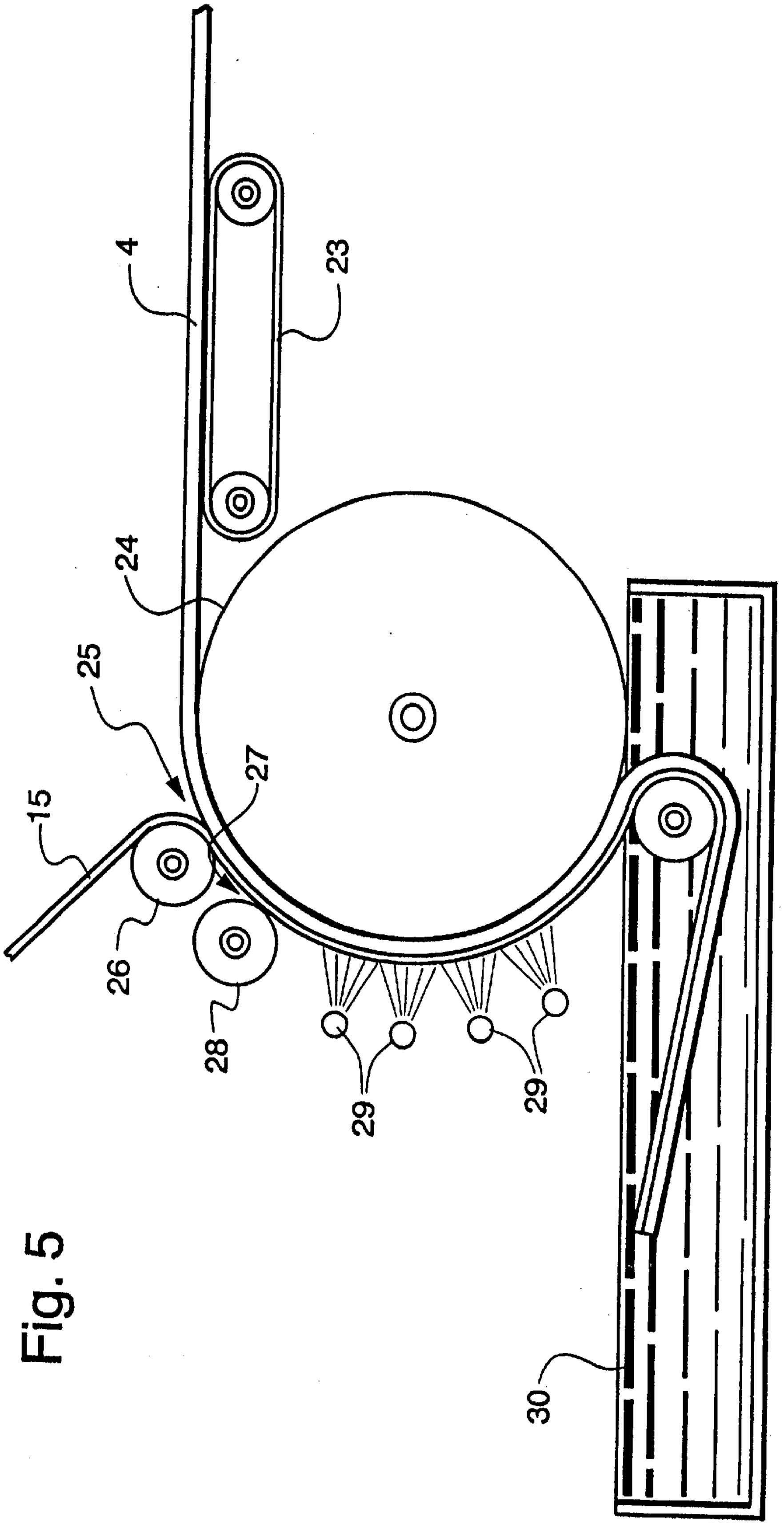
FIG. 5 is a schematic representation of a second process to laminate and emboss the wearlayer/film composite of the present invention to a substrate.

Floor tile can be processed on a drum line in a fashion described in U.S. Pat. No. 4,804,429. Referring to FIG. 5, the vinyl base sheet 4, maintained at a temperature of 300° F. (149° C.) to 340° F. (171° C.), is transferred from a conveyor 23 to a drum 24 that is heated to 180° F. (82° C.) to give good adherence of the vinyl base sheet. The vinyl sheet is fed through the first nip 25 formed by lamination roll 26 and the drum 24. The coated decorative PVC film 15 is fed into the first nip with the exposed side of the film being the side opposite the wearlayer.

In the first nip, the precoated film and base sheet are laminated. Then the coated rigid film/vinyl base mixture is fed through a second nip 27 formed by embossing roll 28 and the drum 24 to give the product an embossed texture. The temperature of the precoated film/vinyl mixture is kept above the glass transition temperature of the film and coating during the embossing process.

The laminated structure is then cooled by pouring water onto the surface with spray heads 29 while the laminated structure is in contact with the drum. The laminated structure is fed into a water bath 30 which brings the temperature of the rigid film/vinyl base below the glass transition temperature of the film.

Acrylated Polyester 1

A hydroxy terminated polyester (polyester polyol) was prepared from the following charge in a 12 liter flask:

| | |
|---|---|
| Trimellitic anhydride | 2259 g |
| 1,6-Hexanediol | 5334 g |
| Phthalic anhydride | 1400 g |
| p-Toluenesulfonic acid | 1.8 g |

The flask was equipped with a mantle, stirrer, thermometer, temperature controller, gas inlet tube, and an upright condenser. The condenser was steam heated and packed with glass helices and had a thermometer on top. The still led to a water cooled condenser that drained into a graduated cylinder. Water collected during the reaction was collected and measured.

The batch was heated to 428° F. (220° C.) under a trickle of nitrogen gas (0.5 Standard Cubic Feet per Hour (SCFH)) during which time water of esterification was collected. The reaction mixture was further heated for 5 hours at a nitrogen flow of 1.0 SCFH.

The reaction mixture was cooled and the total amount of water collected was 643 grams. The final product, Polyester 1, had an acid no. of 2.5 and a hydroxyl no. of 207. It therefore had a hydroxy equivalent weight of 274, and an estimated number average molecular weight of 880.

Polyester 1 was acrylated as follows. The materials listed below were introduced into a 2000 ml flask equipped with a mantle, stirrer, thermometer, gas inlet tube, dropping funnel, and Barrett Trap with a water cooled condenser on top.

| | |
|---|---|
| Heptane | 100 ml |
| Polyester 1 | 800 g |
| Acrylic acid | 277 g |
| Monomethyl ether of hydroquinone | 0.1 g |
| p-Toluenesulfonic acid | 5.38 g |
| Phosphorus acid | 0.6 g |
| Hydroquinone | 0.1 g |
| 2,6-Di-tert-butyl-4-methylphenol | 0.1 g |

The trap was filled to the overflow with heptane. With dry air flow of 0.2 SCFH, the ingredients were heated to reflux at 210° F. (98° C.) to 221° F. (105° C.) while stirring vigorously and collecting water and displacing heptane in the trap. Heptane was added through the dropping funnel as required to maintain reflux at 219° F. (104° C.). After 4 hours of reflux, approximately 65 ml of aqueous distillate had been collected. All of the water from acrylation and heptane were withdrawn from the trap and the dry air flow was increased to 2 SCFH. When distillation stopped, additional heptane had collected in the trap. The batch was cooled to 122° F. (50° C.) with a trickle of dry air. The acid no. of the product was 34.

Polyester 2

A hydroxy terminated polyester was prepared in an identical fashion to that described for Polyester 1 with the following charge weights:

| | |
|---|---|
| 1,6-Hexanediol | 992.7 g |
| Glycerine | 133.5 g |
| Phthalic anhydride | 1071 g |
| Dibutyltin bislauryl mercaptide | 0.5 g |

The reaction mixture was cooled and water collected. The final product had an acid no. of 2.4 and a hydroxyl no. of 179. Therefore, it had a hydroxyl equivalent weight of 316.

Polyester 3

A hydroxy terminated polyester was prepared in an identical fashion to that described for Polyester 1 with the following charge weights:

| | |
|---|---|
| 1,6-Hexanediol | 1058 g |
| Isophthalic acid | 356 g |
| Glycerine | 5 g |
| Adipic acid | 582 g |
| Dibutyltin bislauryl mercaptide | 0.4 g |

The reaction mixture was cooled and water collected. The final product had an acid no. of 0.10 and a hydroxyl no. of 181. Therefore, it had a hydroxyl equivalent weight of 312.

Wearlayer Coating Composition 1

A polyurethane floor covering wearlayer composition was prepared from the following charge in a 5 liter flask equipped with heating mantel, stirrer, and dry air purge at 0.025 SCFH:

| | |
|---|---|
| Polyester 3 | 1111 g |
| Hexanedioldiacrylate | 341 g |
| 2-Hydroxyethylacrylate | 409 g |
| 2,6-Di-tert-butyl-4-methylphenol | 0.72 g |
| Dibutyiltin bislauryl mercaptide | 6.3 g |
| Desmodur W | 96 g |

Desmodur W is 4,4-dicyclohexylmethane diisocyanate sold by Bayer. The flask was heated to 120° F. (49° C.) and the mixture exothermed. This mixture was held at 185° F. (85° C.) for a period of four hours and upon cooling to 140° F. (60° C.) the following materials were added:

| | |
|---|---|
| Acrylic acid | 245 g |
| Decyl acrylate | 516 g |
| Irgacure 500 | 68 g |
| Benzophenone | 35 g |
| Silicone surfactant | 1.7 g |

Irgacure 500 is a 50/50 mixture by weight of benzophenone and Irgacure 184 sold by Ciba-Geigy. An infrared spectrum confirmed complete reaction of the NCO groups.

Wearlayer Coating Composition 2

A polyurethane floor covering wearlayer composition was prepared from the following charge in a 2 liter flask equipped with heating mantel, stirrer, and dry air purge at 0.25 SCFH:

| | |
|---|---|
| Tone M-100 | 126 g |
| Monomer mixture | 125 g |
| Polyester 2 | 35 g |

Tone M-100 is a hydroxyalkylacrylate sold by Union Carbide. The monomer mixture was 27.5% by wt. SR-499, 27.5% by wt. SR502 and 45% by wt. SR351. SR-499, SR502 and SR351 are ethoxylated triacrylates sold by Sartomer. This mixture was heated to 100° F. (36° C.). Eighty-seven grams of Desmodur N-3300, an isocyanurate ring based on hexamethylene diisocyanate sold by Bayer, were added. This mixture was heated to 185° F. (85° C.) and maintained at this temperature for five hours. The mixture was cooled and to the flask was added:

| | |
|---|---|
| Monomer mixture | 15 g |
| Silicone surfactant | 1 g |

The monomer mixture was the same as identified above. An infrared spectrum confirmed that all of the NCO groups had reacted.

Wearlayer Coating Composition 3

A polyurethane floor covering wearlayer composition was prepared from the following charge in a 3 liter flask equipped with heating mantel, stirrer, and dry air purge at 0.25 SCFH:

| | |
|---|---|
| Polyester 2 | 180 g |
| Tone M-100 | 666 g |
| Desmodur N-3300 | 470 g |

This mixture was heated to 185° F. (85° C.) and maintained at this temperature for a period of four hours. The mixture was cooled slightly and to the mixture was added:

| | |
|---|---|
| Acrylated Polyester 1 | 524 g |
| Acrylic acid | 160 g |

An infrared spectrum confirmed that all of the NCO groups had reacted.

COMPARATIVE EXAMPLE 1

Wearlayer Coating Composition 1 was preheated to 110° F. (43° C.) to reduce the viscosity. The Coating Composition 1 was then applied onto a 13 inch wide 3 mil rigid vinyl web similar to that disclosed in Appleyard et al. U.S. Pat. No. 4,804,429, incorporated herein by reference, by using a #30 rod at a line speed of 25 feet per minute (fpm). The web was routed over a 30 inch diameter cooling drum having two 300 watt Fusion system H-bulb lamps mounted in the across machine direction over the rigid vinyl web. Curing Coating Composition 1 under these conditions resulted in distortion of the rigid vinyl film due to the temperature of the rigid film exceeding the glass transition temperature of 83 degrees Celsius. Sections of this film were wound onto a six inch internal diameter core.

An attempt was made to laminate and emboss this film onto a tile base. A vinyl mixture sheet 40–42 mil in thickness was provided on the conveyor such as shown in FIG. 4 at a temperature of 300–320° F. (149–160° C.). The belt was heated to allow for good adherence of the sheet to the belt. This belt line consisted of two sets of rolls used for lamination and embossing processes. The coated film was fed into the first nip with the coated side against the laminator roll. The partially distorted ultra violet (UV) cured coated film adhered to the laminator roll and did not release and laminate to the tile base. No acceptable tile product could be prepared by this method.

EXAMPLE 1

Wearlayer Coating Composition 1, containing no photoinitiators was applied at room temperature onto a 13 inch wide decorated rigid vinyl film, similar to the film of Comparative Example 1, by using a precision reverse three roll coater. The coating application yielded a 2 mil coating. This coated film was routed through an Energy Science Electro-Curtain machine operating at 125 KeV with a 2.75 inch average gap between the titanium electron beam window and the wearlayer/film composite at a line speed of 50 fpm. The dosage was 1.4 Mrad and the level of oxygen within the nitrogen inerted chamber where the coating was cured was kept below 50 parts per million. Color measurements were made on the cured film and the Delta b value computed based on the change in yellowness during cure of the composite rigid film was 1.0.

This material was processed using the belt line described in Comparative Example 1. A vinyl mixture sheet 40–45 mil in thickness was provided on a conveyor at a temperature of 300–320° F. (149–160° C.). The belt was heated to enable good adherence of the sheet to the belt. This belt line consisted of two sets of rolls used for the lamination and embossing processes. Each set of vertical rolls consisted of nip through which the belt and rigid film/tile base were routed. The coated film was fed through the space between the rolls (nip) with the coated side against the laminator roll. In the first nip, the sheet and coated film are laminated together. The heat from the sheet raised the temperature of the coated rigid film above the glass transition temperature.

Shortly after being laminated, the sheet passed through a second nip where embossing of the coated vinyl film provided a surface effect. The temperature of the laminated sheet was maintained above the glass transition temperature of the film and the hardening point of the vinyl mixture sheet to allow for surface embossing.

EXAMPLE 2

Wearlayer Coating Composition 3 was applied onto a 13 inch wide decorative rigid film at a nominal thickness of 1.9–2.0 mil The coated film was routed through an Energy Science Electro-Curtain machine operating at 125 KeV with a 2.75 inch average gap between the titanium electron beam window and wearlayer surface at a line speed of 50 fpm. The dosage was 3.6 Mrad and the level of oxygen within the nitrogen inerted chamber where the coating was cured was kept below 50 parts per million.

Color measurements were made on cured white decorated film and the Delta b value computed based on change in yellowness during coating and curing (at low accelerating energy of 125 KeV) of the composite rigid vinyl film. The Delta b value was 0.60. The final roll of precoated white decorative rigid vinyl film was processed on the same type of belt line as described in Example 1.

EXAMPLE 3

Wearlayer Coating Composition 2 was applied onto a 13 inch wide decorative rigid film at a nominal thickness 1.9–2.0 mil. The coated film was routed through an Energy Science Electro-Curtain machine operating at 125 KeV with a 2.75 inch average gap between the titanium electron beam window and wearlayer surface at a line speed of 50 fpm. The dosage was 3.3 Mrad and the level of oxygen within the nitrogen inerted chamber where the coating was cured was kept below 50 parts per million.

Color measurements were made on the cured film and the Delta b value computed based on change in yellowness during coating and curing of the composite rigid vinyl film. The result was a Delta b of 1.21.

This coated rigid vinyl film was laminated to a vinyl mixture sheet using a belt line similar to that described in Comparative Example 1. The vinyl mixture sheet, 42–47 mil in thickness, was provided on a conveyor at a temperature of 300–320° F. (149–160° C.). The belt was heated to enable good adherence of the sheet to the belt. This belt line contained a nip in which a single roll was used for both lamination and embossing steps. The coated film was fed through the nip with the coated side against the laminator roll. In the nip, the sheet and coated film were laminated and embossed together.

EXAMPLE 4

Wearlayer Coating Composition 3 was applied onto a decorative rigid vinyl film and cured by electron beam in a manner identical to that described in Example 3. In this example, a floor tile was formed on a six foot diameter drum. Details of the process set-up are given in Appleyard et al. U.S. Pat. No. 4,804,429.

Referring to FIG. 5, the vinyl mixture sheet 4 was fed onto conveyor 23 at a temperature of 300–320° F. (149–160C). The sheet 4 was transferred from conveyor 23 to the surface of the upper portion of the drum 24. The drum surface was maintained at a temperature of 180° F. (82° C.) plus or minus 30° F. (17° C.). At this drum temperature, good adherence of the vinyl mixture to the drum was achieved.

At about the 11 o'clock position on the drum, the vinyl mixture was fed through the first nip formed by the laminator roll 26 and the drum roll 24. The coated decorative rigid vinyl film 15 with the wearlayer coated side against the laminator roll 26 met the vinyl mixture sheet 4 at the nip and both film and sheet were laminated.

Then at about 10 o'clock position, a second embossing roll 28 formed a nip with the drum 24 and provided an embossed effect on the surface of the precoated decorative rigid vinyl film.

At about the 9 o'clock position, water was sprayed onto the coated rigid film/sheet to cool the surface of the film to approximately 150° F. (66° C.). The coated film/sheet laminate passed through water bath 30 where the temperature was further reduced below the glass transition temperature of the rigid vinyl film. The laminate was then cut into tiles.

EXAMPLE 5

An experimental abrasion resistant 100% solids inorganic/organic (colloidal silica/acrylate) coating supplied by SDC Inc. of Anaheim, Calif., was applied at room temperature onto a 13 inch wide decorative rigid vinyl film with an offset gravure coater equipped with a smoothing bar. This coated film was routed through an Energy Science Electro-Curtain machine operating at 120 KeV at a line speed of 40 feet per minute. The dosage was 2 Mrad. The final cured coating thickness was approximately 0.5 mils. The roll of cured, precoated decorative rigid vinyl film was processed on the same type of belt line described in Example 1.

EXAMPLE 6

A wearlayer coating composition was prepared by mixing 70% by weight of Acrylated Polyester 1 with 30% by weight of a trifunctional ethoxylated acrylate, SR9035 sold by Sartomer. This coating composition was applied at room temperature onto a 12×12 inch decorative rigid vinyl film with a wire wound rod. This coated film was routed through an Energy Science Electro-Curtain machine operating at 120 KeV at a line speed of 25 feet per minute. The dosage was 2 Mrad. The final cured coating thickness was approximately 1.5 mil. The roll of cured, precoated decorative rigid vinyl film was processed into a tile using a heated press with a 12"×12" tile embossing plate.

EXAMPLES 7 to 9

To illustrate the effect of electron beam penetration on the final color of the white pigmented decorative rigid vinyl film, Wearlayer Coating Composition 3 was applied onto 2.8–3.0 mil decorative rigid vinyl film in a manner identical to that described in Example 3 and electron beam cured at different accelerating energies while maintaining the same dosage of 3.3 Mrad. The cured coated film sections were analyzed for color variation by utilizing a Minolta Colorimeter. Tristimulus color values are summarized as Delta b for each of the examples;

| | KeV | Mrad | Delta b |
|---|---|---|---|
| Example 7 | 125 | 3.3 | 0.94 |
| Example 8 | 130 | 3.3 | 1.81 |
| Example 9 | 135 | 3.3 | 2.25 |

Electron beam curing at an electron beam accelerating energy of 125 KeV did not result in any significant yellowing of the coated white decorative film as indicated by the Delta b value of 0.94 in Example 7. Increasing the accelerating energy to 130 KeV resulted in slight yellowing of the decorative film as evident by a 100% increase in the Delta b value of 1.81 for Example 8. Electron beam curing the coated film at an accelerating voltage of 135 KeV in Example 9 resulted in objectionable yellowing of the decorative film in comparison to the 125 KeV processed sample, e.g., 0.94 versus 2.25 at 135 KeV.

We claim:

1. A process of making a surface covering comprising the steps of:

providing a sheet of vinyl film material, coating the sheet with a wear layer composition comprising a cross-linkable organic moiety, and exposing the wear layer composition to electron beam radiation at an energy level less than that imparted by a 135 KeV field with a 2.75 inch average gap under conditions sufficient to cure the wearlayer and from a mechanically embossable wearlayer having a moiety conversion of greater than 85% adjacent the wearlayer/film interface.

2. The process of claim 1 wherein the wearlayer composition is subjected to about 2 to about 4 Mrad of electron beam radiation.

3. The process of claim 1 further comprising laminating the cured wearlayer/film composite to a substrate with the vinyl film material opposite the substrate.

4. The process of claim 3 further comprising cutting the laminated wearlayer/film/substrate composite to form a floor tile.

5. The process of claim 1 wherein the film is a rigid vinyl film.

6. A process of making a surface covering comprising the step of:

providing a sheet of vinyl film material, coating the sheet with a wearlayer composition comprising a cross-linkable organic moiety, and exposing the wearlayer composition to electron beam radiation at an energy level less than that imparted by a 135 KeV field with a 2.75 inch average gap under conditions sufficient to cure the wearlayer and form a mechanically embossable wearlayer having a double bond conversion of greater than 85% adjacent the wearlayer/film interface.

7. A composite surface covering component comprising:

a mechanically embossable wearlayer comprising an electron beam radiation cured composition including a cross-linked organic moiety; and a film comprising a vinyl composition, wherein the wearlayer composition has a moiety conversion of greater than 85% adjacent the wearlayer/film interface.

8. The surface covering component of claim 7 wherein the wearlayer organic moiety prior to cross-linking is selected from an ethylenic moiety, an acrylic moiety, an epoxide moiety, or mixtures thereof.

9. The surface covering component of claim 7 wherein the film has a thickness of about 1 to about 3 mils.

10. The surface covering component of claim 7 wherein the film is a rigid vinyl film.

11. A surface covering comprising the surface covering component of claim 7 wherein the surface covering is a floor tile.

12. A surface covering comprising the surface covering component of claim 7 wherein the surface covering is a floor covering sheet.

13. The surface covering component of claim 7 wherein the Delta b across the width of the sheet is less than 1.

14. A composite surface covering component comprising:

a mechanically embossable wearlayer comprising an electron beam radiation cured composition including a cross-linked organic moiety; and a film comprising a vinyl composition, wherein the wearlayer composition has a double bond conversion of greater than 85% adjacent the wearlayer/film interface.

15. The surface covering component of claim 14 wherein the wearlayer organic moiety prior to cross-linking is selected from an ethylenic moiety, an acrylic moiety, or mixtures thereof.

* * * * *